Nov. 5, 1957
A. A. MARKOWITZ
2,812,415
COMBINATION CABINET, INCLUDING COOKING, SERVING, DINING AND STORAGE FACILITIES
Filed Aug. 31, 1956
4 Sheets-Sheet 1
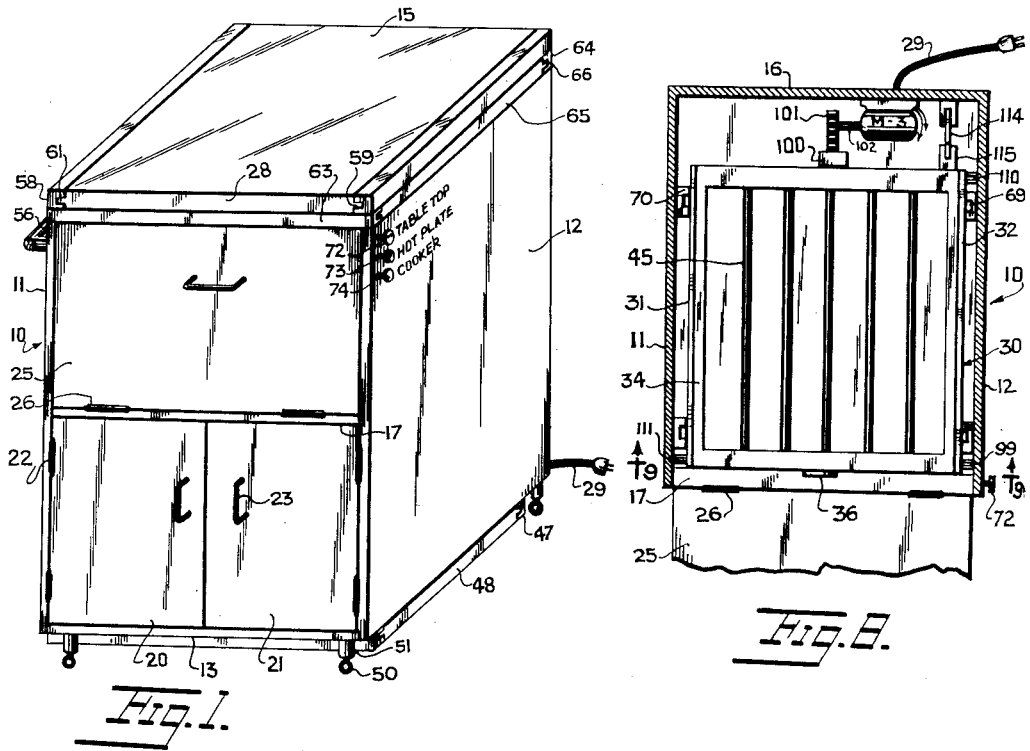
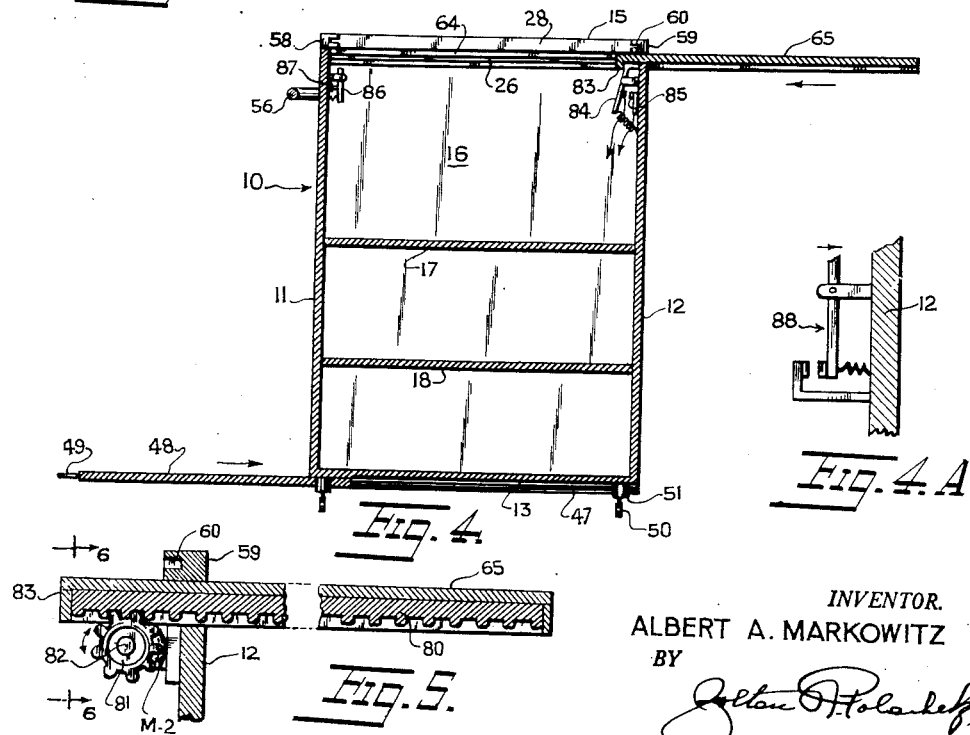
INVENTOR.
ALBERT A. MARKOWITZ
BY
*ATTORNEY*

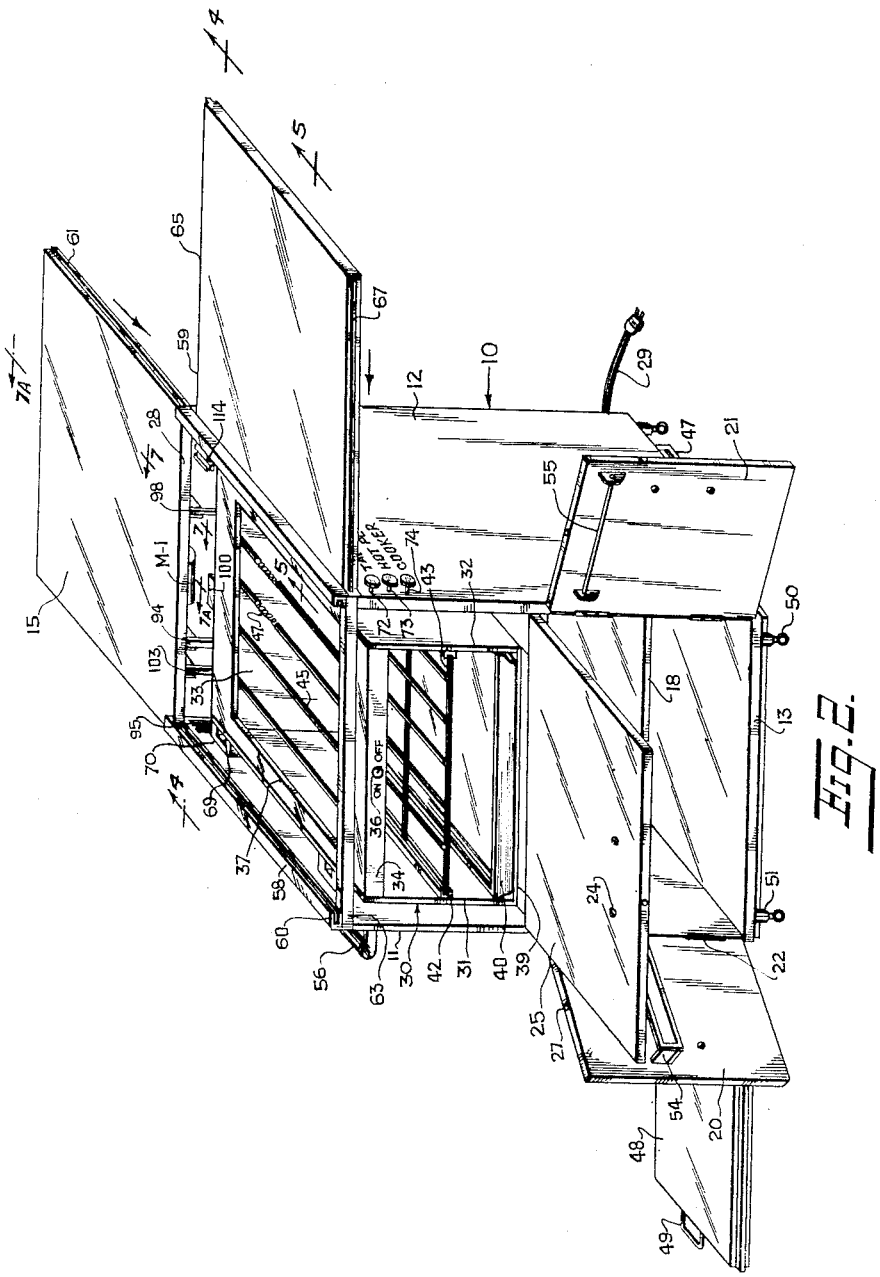

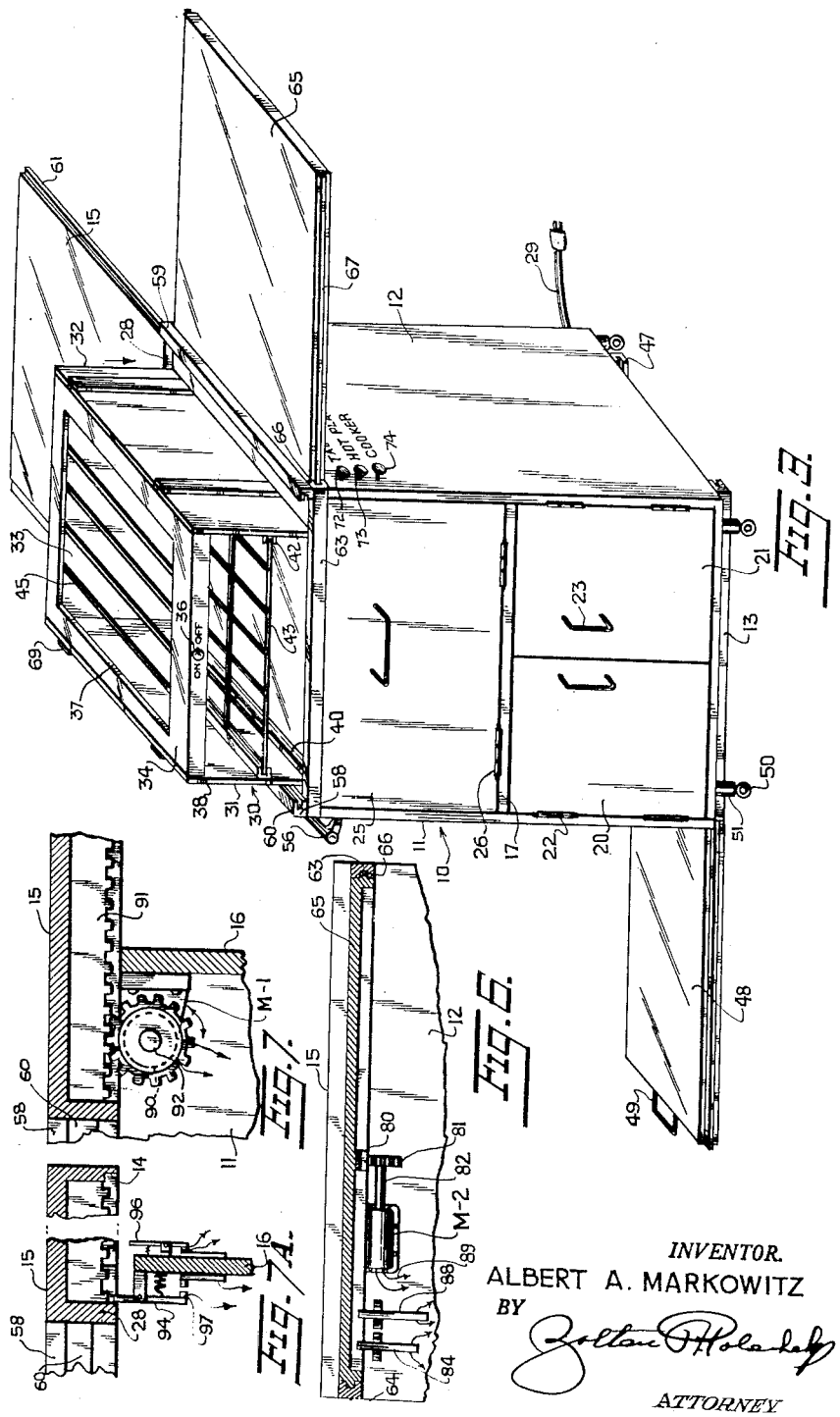

INVENTOR.
ALBERT A. MARKOWITZ
BY
ATTORNEY

United States Patent Office 2,812,415
Patented Nov. 5, 1957

2,812,415

COMBINATION CABINET, INCLUDING COOKING, SERVING, DINING AND STORAGE FACILITIES

Albert A. Markowitz, Bronx, N. Y.

Application August 31, 1956, Serial No. 607,476

2 Claims. (Cl. 219—35)

This invention relates to the cabinet art and particularly concerns a portable cabinet including facilities for storing, cooking, and serving food.

The cabinet is provided with a cooking unit to provide a top-of-stove cooking facility. A movable cover plate may be disposed over the cooking unit to direct heat downwardly for roasting, broiling and baking. The cover plate may be moved to one side and used as a serving or work table or it may be left in place to serve as a cover for the cooking unit and also as a hot plate or griddle as well as a means to keep food warm. The cabinet has a movable top plate which can serve as a flat work surface while on the cabinet and over the cover plate. It can also serve as a dining table, work table or serving table when moved to one side. When the top and cover plates are moved aside the cooking unit can be elevated to project out of the cabinet for convenience in use. All movements of the top plate and cover plate are electrically controlled by an automatically operated switching system. The top and cover plates may be moved aside and the cooking unit elevated in a predetermined sequence. Interlock switches are provided so that the cooking unit cannot be moved unless the top and cover plates are first moved aside. The cover plate, which serves as a heat insulating shield between the cooking unit and cabinet top, cannot be moved aside unless the top plate is first moved aside. In closing the plates and retracting the cooking unit the same predetermined sequence in reverse order is automatically followed. If the wrong button is pushed, the switching system is so arranged that no harm can be done such as driving the cooking unit into the cover plate or vice versa.

It is therefore a principal object of the invention to provide a cabinet providing storage, cooking, serving and dining facilities.

It is a further object to provide a cabinet having a plurality of compartments in one of which is disposed an elevatable cooking unit.

It is a further object to provide a cabinet containing a cooking unit having an open top and a movable cover plate disposed thereover.

It is a further object to provide a cabinet with a plurality of compartments, one of which compartments contains an elevatable and retractible cooking unit having an open top, the cabinet having a pair of superimposed plates laterally movable to expose the cooking unit.

It is a further object to provide a cabinet of the type described with electrical means for elevating the cooking unit and moving the top and cover plates laterally, the electrical means including a switching system having interlock switches to control the movements of the several components in a predetermined sequence.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a cabinet embodying the invention.

Fig. 2 is a perspective view of the cabinet with top plates and storage compartment doors opened.

Fig. 3 is a perspective view similar to Fig. 2 with cooking unit elevated.

Fig. 4 is a vertical sectional view taken on lines 4—4 of Fig. 2.

Fig. 4A is an elevational view of a switch on an enlarged scale.

Fig. 5 is a sectional view taken on lines 5—5 of a portion of Fig. 2.

Fig. 6 is a cross-sectional view taken on lines 6—6 of Fig. 5.

Figs. 7 and 7A are sectional views of portions of Fig. 2 taken on lines 7—7 and 7A—7A thereof.

Fig. 8 is a top plan view of the cooking unit with a portion of the cabinet shown in cross section.

Figure 10:
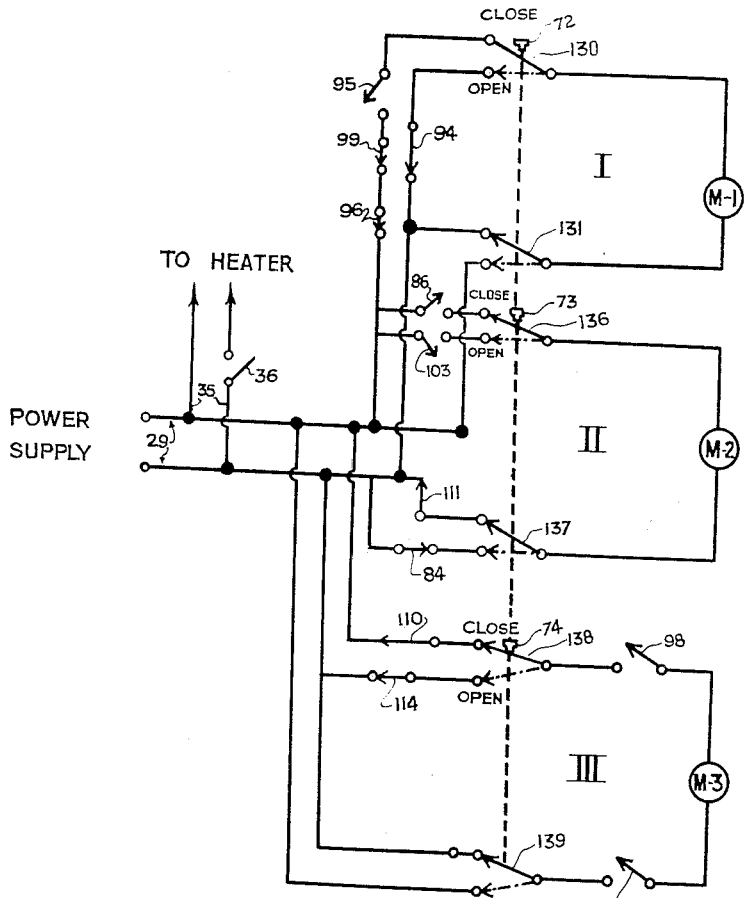
Fig. 10 is a schematic diagram of the electrical system forming part of the invention.

The cabinet as shown in Figs. 1–4 is a hollow rectangular casing 10 having side walls 11, 12, a bottom plate or shelf 13, a top plate 15 and a rear wall 16. The cabinet is divided into a plurality of compartments by horizontal partitions or shelves 17 and 18. Doors 20 and 21 at the front of the cabinet serve to close the compartments defined between shelves 17, 18 and 13, 18, respectively. The doors are pivotally mounted on sides 11, 12 by hinges 22. Handles 23 are provided for convenience in opening and closing the doors. Another door 25 is pivotally attached by hinges 26 to shelf 17. This door 25 serves to close the compartment in which is disposed the cooking unit 30. This unit may be supplied with oil, coal, electrical energy or other fuel means. In the particular arrangement shown in the drawings the cooking unit is powered electrically via a cable 29.

The cooking unit has a frame structure including side plates 31, 32 and a rear plate 33. Top 34 of the unit 30 is a frame-like member having a rectangular opening 37. The front of the unit 30 has a rectangular opening 38 defined between sides 31, 32, frame 34 and bottom plate 39. Within the unit 30 is a tray 40 resting on the bottom plate 39. A pair of channel members 42 attached to the sides of the unit serve to support a wire grid 43. Above the grid and just below the opening 37 are a plurality of parallel heater bars 45. These heater bars contain electrical resistance wires 44 shown in Fig. 2. The bars are hollow tubes which completely enclose the wires. If desired, these rods may serve as supports for a container of charcoal or other type of fuel.

The cabinet is mounted on casters 50 journalled in posts 51. On doors 20, 21 are mounted a utility shelf 54 and a utility rack 55, respectively. On side 11 of the cabinet is a rail 56 which serves as a handle for wheeling the cabinet about. This rail may also serve as a towel rack and napkin holder. The top plate 15 is horizontally or laterally rovable in rails 58, 59. These rails are channel members having grooves 60 in which fit corresponding tongues or ridges 61 formed at the sides of the table top plate 15. The rails 58, 59 are mounted on and are perpendicular to another pair of rails 63, 64 located at the front and rear respectively of the cabinet on sides 11, 12. A metal cover plate 65 for the cooking unit 30 is slidable in groves 66 in rails 63, 64. Cover plate 65 has molded tongues or ridges 67 which are engaged in grooves 66. The sides 31, 32 of the unit 30 carry a plurality of bars 69 arranged to slide in rails 70. Rails 70 are channel members attached to the sides 11, 12 of the cabinet.

Doors 20, 21, 25 are opened and closed manually. The handles 23 are held to the doors by screws 24. Catch members 27 engage the shelf 17 and the bottom of rail 63 to hold the doors in closed positions. A pair of grooved rails 47 are mounted beneath bottom plate 13. A board 48 is slidably mounted in these rails. The board is provided with a handle 49 for extending and retracting the board. This board may serve as a platform for a refuse can and can be carried with the cabinet as it is wheeled about on casters 50.

The plates 15, 65 and unit 30 are movable by electrically operated and controlled means. In Figs. 4, 4A, 5 and 6 are shown the means for moving cover plate 65 which includes a gear rack 80 disposed transversely across the underside of plate 65. The gear rack is arranged to engage a spur gear 81 carried on shaft 82 of a motor M-2. The motor is attached to side wall 12 of the cabinet. The motor is energized via wires 89. Plate 65 moves laterally in the side rails 63, 64. The plate 65 is provided with a depending flange 83. When the plate 65 is fully extended from the cabinet flange 83 engages the movable contact of switch 84 connected in a circuit energizing motor M-2 best shown in Fig. 10. The movable contact of switch 84 is pivoted to break the contact with fixed switch terminal 85. When the plate 65 is fully retracted in the cabinet, it engages the arm of switch 86 mounted pivotally on side wall 11 as shown in Fig. 4. The engagement of flange 83 with switch arm 86 breaks the contact between contacts 87. Another switch 88, as shown in Fig. 4A, is mounted on wall 12 adjacent to switch 84, and will be described in connection with Fig. 10. This switch is normally open and when the plate 65 is fully extended the flange 83 holds the switch closed.

In Fig. 7 a gear 90 is shown engaged with gear rack 91 attached to top plate 15 and used to move the top plate 15 laterally. Gear 90 is mounted on shaft 92 of motor M-1. The motor is mounted on rear wall 16 of the cabinet. A pair of switches 94, 95 shown in Fig. 2 are mounted on the inside of wall 16 in such a manner that they are pivoted by flange portion 28 depending from top plate 15 when the plate is fully extended laterally from the cabinet. Switch 94 is normally closed and switch 95 is normally open. Another switch 96 is mounted on the outside of wall 16. The switch contacts 97 are normally closed and can be opened by depending flange 14 of the top plate 15 when the plate is retracted on the cabinet over cover plate 65.

In Fig. 8 a gear rack 100 is mounted on the rear of unit 30. This gear rack is engaged by spur gear 101 carried on shaft 102 of motor M-3. The motor is mounted on rear wall 16 of the cabinet. The unit 30 may be elevated and lowered by rotation of gear 101 in engagement with gear rack 100. The bars 69 slide in rails 70 to insure vertical movement of the cooking unit 30. The bottom plate 39 of unit 30 engages arms of switches 99, 110, 111, when the unit reaches its lowermost point of travel. To open or close the switches mounted on shelf 17 as required will be described in connection with Fig. 10.

Figure 9:
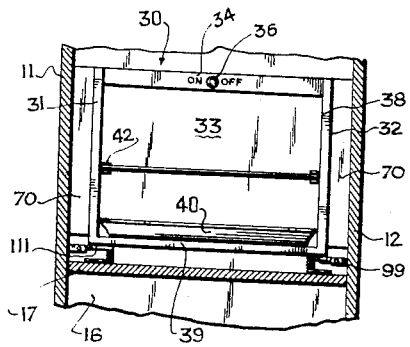
Fig. 9 is an elevational sectional view of a portion of the cabinet showing the cooking unit in a lowered position.
Figure 9A:
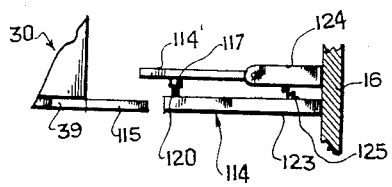
Fig. 9A is an elevational view on an enlarged scale of a switch.

Switch 110 is normally closed and switches 99, 111 are normally open when the unit 30 is extended out of the cabinet. Switch 114 is provided near the top of wall 16. The arm 114' of switch 114 is engaged by lug 115 extending rearwardly from the bottom plate 39 of the unit 30 when the cooking unit is elevated and extends through the open top of the cabinet. The switch 114 is normally closed. It has an insulated bar carrying a movable contact 117 as shown in Fig. 9A. This contact is normally held closed and in contact with stationary contact 120 mounted on insulated bar 123. The arm 114' of switch 114 is pivotally mounted in bracket arms 124 attached to wall 16. Spring 125 attached to arm 114' holds the contact closed. When lug 115 pivots arm 114' the contacts 117, 120 open. The switch 114 is in circuit with motor M-3 as shown in Fig. 10.

In Fig. 10 is shown the electrical system used for controlling the lateral opening and closing of the top and cover plates and elevation of the cooking unit.

The circuits I, II, III, are energized from a suitable power source via wires 29. Wires 35 are connected to the same source and energize the heater wires 44 via a switch 36 mounted on frame 34 of the cooking unit. Circuits I, II and III are controlled respectively by push buttons 72, 73, 74 mounted on side wall 12.

In circuit I, the push button 72 moves a pair of ganged switch arms 130, 131 to either of two positions. In the "open" position motor M-1 is energized to open top plate 15 via switch 94. The switch 94 is normally closed. When the plate 15 is fully opened, flange 28 engages the arm of switch 94 to open the limit switch and stop motor M-1. To close plate 15 switch arms 130, 131 are set in the "close" position shown in Fig. 10. This connects motor M-1 in another circuit in which the direction of rotation of the motor is reversed. Now the motor is energized via switches 95, 96, 99. Switch 96 shown in Fig. 7A, was closed when flange 14 moved laterally as the plate 15 opened. This limit switch opens when plate 15 is retracted to open the circuit of motor M-1. Switches 99, 95 are actuated by the unit 30 and plate 65, respectively. Switch 99 is an interlock switch mounted so that the switch is closed only when the cooking unit is fully retracted as shown in Fig. 9. Switch 95 is a normally open interlock switch mounted to be closed by flange 83 when plate 65 is closed. It will thus be apparent that switches 95, 99 are interlock switches which prevent closing of top plate 15 unless the cooking unit and plate 65 are in proper closed positions. Switch 96 is a limit switch which opens and stops motor M-1 when the top plate 15 fully closes. As the plate 15 moves to a closed position limit switch 94 closes as flange 28 becomes disengaged from arm 94. This sets the "open" circuit for operation the next time push button 72 is operated to set arms 130, 131 in the "open" position.

Circuit II is controlled by push button 73. This button sets arms 136, 137 alternatively in "close" and "open" positions to control movement of cover plate 65. Motor M-2 can open plate 65 only if plate 15 is open. This is required because plate 65 serves as an insulation or shield between the heater bars 45 and plate 15. If plate 65 were open while plate 15 was closed, plate 15 might be damaged by the heater. The interlock switch 103 in the "open" circuit of motor M-2 is closed only when plate 15 is open. This switch is normally open and is actuated by flange 28 when plate 15 is fully open to close the switch. Switch 84 is a limit switch which is normally closed and is opened by flange 83 when plate 65 is fully open. To close plate 65 it is necessary that the cooking unit be fully retracted. Interlock switch 111 must be thus closed. This switch as shown in Fig. 9 is closed when the cooking unit 30 is retracted. Switch 86 is a limit switch which opens when the plate 65 is fully closed. This switch is actuated by flange 83 shown in Fig. 4. Push button 73 moves arms 136, 137 to the "close" position to close plate 65.

Circuit III controls the elevation and lowering of the cooking unit 30. Push button 74 controls arms 138, 139. To raise the unit, plates 15 and 65 must be open. Interlock switches 98, 88 are provided for this purpose in the circuit of motor M-3. Switch 98 closes when plate 15 is open. This switch is normally held open but is closed by flange 28 when plate 15 is fully open. Switch 88 is normally held open and is closed by flange 83 only when plate 65 is fully open. Thus the cooking unit can be lowered and raised only when interlock switches 88, 98 are closed. Switch 114 is a limit switch which stops motor M-3 when the unit 30 is fully elevated. Switch 110 is a limit switch which opens and stops motor M-3 when the unit is fully lowered.

The plates 15 and 65 and the cooking unit 30 can be moved only in a predetermined sequence controlled by the several interlock and limit switches. Thus, if the three push buttons 72, 73, 74 are all set to the "open" position, top plate 15 will first open, then cover plate 65 will open and finally unit 30 will be elevated. If all push buttons are then set to the "close" position, unit 30 will first be lowered, then cover plate 65 will close and finally top plate 15 will close. If the push button 74 is set to the "open" position while top plate 15 and cover plate 65 are both closed the unit 30 will not move because the interlock switches which are in the circuit of motor M–3 are closed only when the top plate and cover plate are fully open. Similarly cover plate 65 cannot open and top plate 15 cannot close unless the interlock switches which are in the circuits of their operating motors are properly closed. Thus, an incorrect setting of a push button can do no harm. The several components which are operated by electric motors are kept under full and automatic control of the electrical system.

The present invention is particularly intended for use in such places as trailers, outdoor camping places and wherever a portable cooking, storage and serving facility is required. The cooking unit can be used as a broiler with downwardly directed top heating when cover plate 65 is closed and can be used as a top-of-the-stove cooking device when the cover plate is either open or closed, provided top plate 15 is open. The cover plate then may serve as a griddle or as a hot plate to keep food warm before it is served on to the open top plate which is laterally extended and is used as a dining or serving table.

The present device may also be used as a convenient serving cart in which food is prepared in one place and then the device is wheeled to a dining area where it can be arranged to provide serving and dining tables. The device is thus adapted for indoor and outdoor use, wherever required, as well as in vehicles such as boats, trailers, etc. The present device, with its reversible motors, is particularly well adapted for use in those installations where direct current is readily available. Of course, reversible motors using alternating current may also be used.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A cabinet including cooking, storage, and serving facilities, comprising a generally rectangular hollow casing having an open top, a plurality of partitions in the casing dividing the space therein into a plurality of compartments, one of said compartments containing a cooking unit, said unit being mounted on rails for vertical movement of the unit through said open top, a pair of rectangular plates disposed over said open top and laterally displaceable therefrom in mutually perpendicular directions, said unit having a frame-like structure with a rectangular opening therein, one of said plates being a metallic member serving as a cover and heat shield for said rectangular opening, the other of said plates serving as a work surface, electrical means for displacing said plates and elevating said unit in a predetermined sequence, said means including limit switches for limiting displacement of said plates and interlock switches for controlling said sequence, a plurality of doors pivotally mounted on said casing and serving as closures for each of said compartments, said casing being movably mounted on casters, and a platform slidably mounted beneath said casing and movable therewith, in a direction opposite to the direction of movement of one of said plates.

2. A cabinet including cooking, storage, and serving facilities, comprising a generally rectangular hollow casing having an open top, a plurality of partitions in the casing dividing the space therein into a plurality of compartments, one of said compartments containing a cooking unit, said unit being mounted on rails for vertical movement of the unit through said open top, a pair of rectangular plates disposed over said open top and laterally displaceable therefrom in mutually perpendicular directions, and electrical means for displacing said plates and elevating said unit in a predetermined sequence, said means comprising a first motor and gear means arranged to displace a top one of said plates, said motor being in circuit with a pair of limit switches to stop driving motion of said motor, said pair of limit switches being in series circuit with a pair of interlock switches, said interlock switches being disposed for actuation by said unit and the other one of said plates, another driving motor and gear means arranged to displace said other plate, a further pair of limit switches arranged to stop driving motion of said other motor, said further pair of limit switches being in circuit with other interlock switches, said other interlock switches being disposed for actuation by said unit and said top plate, a third motor arranged with gear means to displace said unit vertically, a third pair of limit switches arranged to stop driving motion of said third motor, and a third pair of interlock switches disposed for actuation by said plates and arranged in series circuit with said third motor.

References Cited in the file of this patent

UNITED STATES PATENTS

| | | |
|---|---|---|
| 918,780 | Shier | Apr. 20, 1909 |
| 1,094,786 | Heath | Apr. 28, 1914 |
| 2,163,165 | Wise | June 20, 1939 |
| 2,180,161 | Miller | Nov. 14, 1939 |
| 2,658,985 | Maxwell | Nov. 10, 1953 |